United States Patent [19]

Cuperus

[11] Patent Number: 5,256,435
[45] Date of Patent: Oct. 26, 1993

[54] PROCESS FOR THE PRODUCTION OF DRIED PASTAS

[75] Inventor: Herman J. Cuperus, Kuesnacht, Switzerland

[73] Assignee: Nestec S.A., Vevey, Switzerland

[21] Appl. No.: 761,673

[22] Filed: Sep. 18, 1991

[30] Foreign Application Priority Data

Nov. 8, 1990 [CH] Switzerland ............. 3548/90-4

[51] Int. Cl.$^5$ ............................................. A23L 1/16
[52] U.S. Cl. ............................. 426/557; 426/451; 426/458
[58] Field of Search ................. 426/557, 451, 458

[56] References Cited

U.S. PATENT DOCUMENTS

| | | | |
|---|---|---|---|
| 3,537,862 | 11/1970 | Peters et al. | 426/557 |
| 4,517,215 | 5/1985 | Hsu | 426/557 |
| 4,599,238 | 7/1986 | Saitoh et al. | 426/451 |
| 4,659,576 | 4/1987 | Dahle et al. | 426/557 |
| 4,675,199 | 6/1987 | Hsu | 426/557 |
| 4,828,852 | 5/1989 | Hsu et al. | 426/557 |
| 4,876,104 | 10/1989 | McGuire et al. | 426/557 |
| 4,898,744 | 2/1990 | Leggett et al. | 426/557 |
| 4,990,349 | 2/1991 | Chawan et al. | 426/557 |

*Primary Examiner*—Jeanette Hunter
*Assistant Examiner*—Mary S. Mims
*Attorney, Agent, or Firm*—Vogt & O'Donnell

[57] ABSTRACT

Pasta prepared from a mixture of ground cereal product and water is cooked with steam while intermittently spraying water having a pH of from 5 to 5.5 and a temperature of at least 90° C. on the pasta to hydrate the pasta, such that during cooking and hydration the temperature of the pasta does not fall below 97° C., to obtain a cooked pasta having a dry matter content of from 35% to 45% by weight. The cooked pasta then is dried.

8 Claims, No Drawings

PROCESS FOR THE PRODUCTION OF DRIED PASTAS

BACKGROUND OF THE INVENTION

This invention relates to a process for the production of dried pastas which can rapidly be reconstituted for consumption.

It is known that dried pastas for rapid reconstitution can be produced by extrusion of a ground mixture of cereal and water having a dry matter content of 70% by weight, precooking of the extruded mixture in boiling water until precooked pastas having a dry matter content of 30% are obtained and then drying the precooked pastas to a dry matter content of approximately 90%. The pastas obtained can be rapidly reconstituted by addition of water and heating for 3 to 8 minutes in a microwave oven.

When a process such as this is carried out on an industrial scale, two potentially dissuasive problems can arise. First of all, a relatively large amount of energy is required for drying the precooked pastas having a dry matter content of 30% to a dry matter content of 90%. On the other hand, the losses of starting material involved in precooking with boiling water are high, namely of the order of 10 to 12% by weight.

SUMMARY OF THE INVENTION

The problem addressed by the present invention was to obviate these disadvantages and to provide a process for the production of dried pastas which would enable the losses of starting material during precooking and the quantity of energy required for drying to be reduced. To this end, the present invention relates to a process in which a mixture comprising a ground cereal product and water is prepared, pastas are formed from the resulting mixture, the pastas are precooked with steam and, at the same time, are intermittently sprayed with very hot water at pH 5.0 to 5.5 to obtain precooked pastas having a dry matter content of 35 to 45% by weight, after which the precooked pastas are dried.

One advantage of this process is that it enables the total quantity of water used for precooking, i.e., water charged with starting material, essentially starch, which is difficult to recycle, to be reduced. Another advantage of the process according to the invention is that it enables precooked pastas of which the starch is totally gelatinized and the protein network completely formed to be obtained.

The process according to the invention is distinguished in particular by the fact that it provides for the production of totally precooked pastas to be dried which have a dry matter content higher by at least 16% and as much as 50% than that of the precooked pastas obtained by conventional processes, while at the same time ensuring that the pastas keep their organoleptic qualities. The quantity of energy required for drying the precooked pastas according to the invention to a dry matter content of approximately 90% is lower by 8 to 25% than the quantity of energy required for drying precooked pastas in the conventional manner.

DETAILED DESCRIPTION OF THE INVENTION

In the following part of the specification, the percentages and parts are by weight.

To carry out the process according to the invention, a mixture comprising a ground cereal product and water is prepared. For example, it is possible to use flour and/or semolina obtained by grinding of cereal grains, such as wheat, rice or corn. Additives such as fresh or dehydrated eggs, salt, spices, flavourings or emulsifiers may be added to the mixture of additives. Water may be added in a quantity sufficient to obtain a mixture having a dry matter content of 65 to 75%. The pastas are then formed, for example by extrusion of the mixture in a screw extruder or a rotary bar extruder or by rolling followed by cutting to provide the pastas with the desired shape and size.

The pastas thus formed are then precooked with steam while at the same time being intermittently sprayed with very hot water at pH 5.0 to 5.5. The pastas are preferably sprayed with water at 90° to 98° C. which ensures that the pastas are hydrated during precooking and that a cooked end product is obtained in which the starch is completely gelatinized and the protein network completely formed.

It has been found that, if the pastas are precooked with steam without being sprayed with water, hydration of the pastas is inadequate and the end product is not totally cooked. If the spraying with water is carried out continuously, the hydration of the pastas is excessive and significant amounts of starting material are lost by lixiviation. Finally, if spraying is carried out intermittently, but with water at a temperature below 90° C., the product cools and does not sufficiently absorb water to allow complete gelatinization of the starch. It is also important that the temperature of the pastas throughout the precooking step should not be below 97° C. to allow complete gelatinization of the starch and to enable a totally cooked product to be obtained Spraying is carried out with water at pH 5.0 to 5.5which is obtained, for example, by addition of citric acid or maleic acid. It is useful to form intermediate bonds between the fibrils of the proteins in order to strengthen the structure of the pastas and to obtain firm pastas after cooking, while at the same time reducing the risks of losses of starting material.

In one particular embodiment of the process according to the invention, the formed pastas may be arranged on a conveyor belt which passes through the interior of a fluidtight enclosure in which a steam atmosphere at 98°–100° C. is maintained. Inside this enclosure, sprinklers may be suspended at regular intervals above the conveyor belt so that the pastas are intermittently sprayed with very hot water at pH 5.0 to 5.5. Precooking may be carried out for about 4 to 8 minutes to obtain precooked pastas having a dry matter content of 35 to 45%.

After precooking, the pastas may be sprayed with water at 15° C. to cool them rapidly to around 20° C. and to remove any starch still adhering to their surface. The precooked pastas may then be dried, for example in a hot-air dryer at 60° to 80° C., by infrared radiation or by microwaves to obtain dried pastas having a dry matter content of 88 to 95%.

The dried pastas obtained by the process according to the invention may rapidly be reconstituted for consumption, for example by cooking for 4 to 7 minutes in boiling water or by addition of cold or tepid water and heating for 5 to 8 minutes in a microwave oven, depending on the size of the pastas used.

The process according to the invention for the production of dried pastas may be carried out discontinuously, semi-continuously or, preferably, continuously.

The invention is illustrated in more detail by the following Examples.

Example 1

A mixture comprising 70 kg hard wheat semolina having a dry matter content of 14 to 15% and 21 liters water is prepared. The mixture thus prepared has a dry matter content of approximately 30%. The mixture is kneaded in a screw extruder and is then discharged from the extruder through an extrusion die to form pastas in the form of spirals having a wall thickness of 0.6 mm. The pastas thus formed are arranged in a layer approximately 2 centimeters thick on a conveyor belt which passes through the interior of an enclosure in which a steam atmosphere at 98° to 100° C. is maintained.

Suspended inside the enclosure are four sprinklers at a distance of 85 cm from one another which spray the conveyor belt and the pastas arranged thereon with water at pH 5.2 at a temperature of 93° C.

The pastas remain inside the enclosure for about 6 minutes and, on leaving the enclosure, are sprayed with water at 15° C. for about 10 seconds so that the pastas obtained have a temperature of 20° C. and a dry matter content of 40%. The precooked pastas are then transported by a stream of cold water, which keeps them separated, to a screen where they are drained. The pastas are then dried for about 3 hours in a hot-air dryer at a temperature of 80° C. to a dry matter content of 90%.

The pastas thus obtained may be prepared for consumption, for example, by cooking for about 4 minutes in boiling water or by immersion in cold water and heating for about 5 minutes in a microwave oven.

The pastas obtained are comparable in their organoleptic properties with pastas obtained in the conventional manner.

The losses of starting material, essentially starch, which occur during the precooking step are measured in % by weight.

For comparison, pastas are prepared similarly to the method described above by extrusion, precooking for 6 minutes in a bath of boiling water at pH 5.2, cooling by spraying with cold water, transport in a stream of water to a screen, draining and drying under the same conditions.

The following results are obtained:
pretreatment according to the invention: 6 to 8% losses
pretreatment in boiling water: 10 to 12% losses.

Accordingly, the pretreatment according to the invention enables the losses of starting material to be reduced by about one third of their value.

EXAMPLE 2

Pastas in the form of spirals having a wall thickness of 0.9 mm are prepared similarly to the method described in Example 1. The pastas thus prepared are dried to a dry matter content of 95% and are then mixed with a dehydrated sauce. The pastas may then be reconstituted by cooking for about 7 minutes in boiling water or by immersion in cold water and heating for about 8 minutes in a microwave oven. A prepared meal of pasta and sauce which has good organoleptic qualities is thus obtained.

I claim:

1. A process for the production of a pasta product comprising preparing and forming a pasta from a mixture of a ground cereal product and water to obtain a formed pasta, steaming the formed pasta while intermittently spraying water having a pH of from 5 to 5.5 and a temperature of 90° C. onto the formed pasta, so that a temperature of the formed pasta steamed and sprayed does not fall below 97° C., to cook and hydrate the formed pasta to obtain a cooked pasta having a dry matter content of from 35% to 45% by weight and then drying the cooked pasta.

2. A process according to claim 1 wherein the water has a temperature of from 90° C. to 98° C.

3. A process according to claim 1 wherein the steam provides a steam atmosphere having a temperature of between 98° C. and 100° C.

4. A process according to claim 2 wherein the steam provides a steam atmosphere having a temperature of between 98° C. and 100° C.

5. A process according to claim 1 wherein the formed pasta has a dry matter content of from 65% to 75%.

6. A process according to claim 1 wherein the cooked pasta is dried to a dry matter content of from 88% to 95%.

7. A process according to claim 1 further comprising spraying the cooked pasta with water to cool the cooked pasta and to remove adhering starch prior to drying it.

8. A process according to claim 6 further comprising spraying the cooked pasta with water to cool the cooked pasta and to remove adhering starch prior to drying it.

* * * * *

UNITED STATES PATENT AND TRADEMARK OFFICE
CERTIFICATE OF CORRECTION

PATENT NO. : 5,256,435
DATED : October 26, 1993
INVENTOR(S) : Herman Jacob CUPERUS It is certified that error appears in the above-identified patent and that said Letters Patent is hereby corrected as shown below:

Column 4, line 22 (line 6 of claim 1), after "of" insert "at least".

Signed and Sealed this

Twelfth Day of April, 1994

Attest:

BRUCE LEHMAN

Attesting Officer    Commissioner of Patents and Trademarks